US008423328B2

(12) United States Patent
Cohn et al.

(10) Patent No.: US 8,423,328 B2
(45) Date of Patent: Apr. 16, 2013

(54) METHOD OF DISTRIBUTING A RANDOM VARIABLE USING STATISTICALLY CORRECT SPATIAL INTERPOLATION CONTINUOUSLY WITH SPATIALLY INHOMOGENEOUS STATISTICAL CORRELATION VERSUS DISTANCE, STANDARD DEVIATION, AND MEAN

(75) Inventors: John M. Cohn, Essex Junction, VT (US); Ulrich A. Finkler, Yorktown Heights, NY (US); David J. Hathaway, Essex Junction, VT (US); Jeffrey G. Hemmett, Essex Junction, VT (US); Fook-Luen Heng, Yorktown Heights, NY (US); Jason D Hibbeler, Essex Junction, VT (US); Gie Lee, Essex Junction, VT (US); Wayne H. Woods, Jr., Essex Junction, VT (US); Cole E. Zemke, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 12/570,195

(22) Filed: Sep. 30, 2009

(65) Prior Publication Data

US 2011/0077916 A1 Mar. 31, 2011

(51) Int. Cl.
*G06F 17/17* (2006.01)
(52) U.S. Cl.
USPC ............... 703/2; 708/274; 708/290; 702/179; 716/100; 716/132
(58) Field of Classification Search ...... 703/2; 702/179; 716/100, 132; 708/274, 290
See application file for complete search history.

(56) References Cited

U.S. PATENT DOCUMENTS

| | | | |
|---|---|---|---|
| 6,317,640 B1 | 11/2001 | Rao et al. | |
| 6,951,006 B1 * | 9/2005 | Teig et al. | 716/129 |
| 7,032,201 B1 * | 4/2006 | Teig et al. | 716/129 |
| 7,076,091 B2 * | 7/2006 | Rosenfeld | 382/131 |
| 7,092,838 B1 | 8/2006 | Srinivas et al. | |
| 7,106,352 B2 * | 9/2006 | Deering | 345/694 |
| 7,212,946 B1 * | 5/2007 | Venkateswaran et al. | 702/179 |
| 7,272,808 B1 | 9/2007 | Sharma et al. | |

(Continued)

OTHER PUBLICATIONS

Zhang et al., Across Wafer Critical Dimension Uniformity Enhancement Through Lithography and Etch Process Sequence: Concept, Approach, Modeling, and Experiment. IEEE Transactions on Semiconductor Manufacturing Nov. 2007, vol. 20, No. 4, pp. 488-505.

(Continued)

*Primary Examiner* — Saif Alhija
*Assistant Examiner* — Kibrom Gebresilassie
(74) *Attorney, Agent, or Firm* — Gibb & Riley, LLC; Richard M. Kotulak, Esq.

(57) ABSTRACT

Methods for modeling a random variable with spatially inhomogenous statistical correlation versus distance, standard deviation, and mean by spatial interpolation with statistical corrections. The method includes assigning statistically independent random variable to a set of seed points in a coordinate frame and defining a plurality of test points at respective spatial locations in the coordinate frame. A equation for a random variable is determined for each of the test points by spatial interpolation from one or more of the random variable assigned to the seed points. The method further includes adjusting the equation of the random variable at each of the test point with respective correction factor equations.

27 Claims, 13 Drawing Sheets

U.S. PATENT DOCUMENTS

| | | | |
|---|---|---|---|
| 7,280,939 B2* | 10/2007 | Hathaway et al. | 702/182 |
| 7,512,921 B2* | 3/2009 | Shibuya | 716/119 |
| 7,711,524 B2* | 5/2010 | Johri et al. | 702/189 |
| 7,844,418 B2* | 11/2010 | Hemmett et al. | 702/179 |
| 8,065,124 B2* | 11/2011 | Xu et al. | 703/6 |
| 8,096,950 B2* | 1/2012 | Tanigawa et al. | 600/443 |
| 8,184,712 B2* | 5/2012 | Mukherjee | 375/240.21 |
| 8,214,779 B2* | 7/2012 | Lu | 716/100 |
| 2002/0171660 A1* | 11/2002 | Luo et al. | 345/582 |
| 2003/0142104 A1* | 7/2003 | Lavelle et al. | 345/552 |
| 2003/0184551 A1* | 10/2003 | Kurihara et al. | 345/572 |
| 2004/0012611 A1* | 1/2004 | Taneja et al. | 345/611 |
| 2004/0034815 A1* | 2/2004 | Yamada | 714/37 |
| 2004/0042676 A1* | 3/2004 | Srinivasa | 382/254 |
| 2004/0136608 A1* | 7/2004 | Rosenfeld | 382/276 |
| 2004/0174378 A1* | 9/2004 | Deering | 345/611 |
| 2005/0203377 A1* | 9/2005 | Watts et al. | 600/410 |
| 2006/0036561 A1* | 2/2006 | Aladahalli et al. | 706/48 |
| 2006/0150129 A1 | 7/2006 | Chiu et al. | |
| 2006/0161412 A1 | 7/2006 | Angyal et al. | |
| 2006/0232713 A1* | 10/2006 | Zhou et al. | 348/701 |
| 2006/0253820 A1* | 11/2006 | Bzowy | 716/6 |
| 2007/0174797 A1* | 7/2007 | Luo et al. | 716/4 |
| 2007/0220455 A1* | 9/2007 | Joshi et al. | 716/4 |
| 2009/0003672 A1* | 1/2009 | Maier et al. | 382/128 |
| 2009/0024371 A1* | 1/2009 | Xu et al. | 703/2 |
| 2009/0144685 A1* | 6/2009 | Jiang et al. | 716/8 |
| 2009/0204365 A1* | 8/2009 | Lu | 702/179 |
| 2009/0204367 A1* | 8/2009 | Hemmett et al. | 702/179 |
| 2010/0045692 A1* | 2/2010 | Nemirovsky et al. | 345/582 |
| 2010/0174514 A1* | 7/2010 | Melkumyan et al. | 703/2 |
| 2010/0292904 A1* | 11/2010 | Taguchi et al. | 701/93 |
| 2011/0191129 A1* | 8/2011 | Moriya | 705/7.11 |
| 2011/0264265 A1* | 10/2011 | Kanemoto | 700/252 |
| 2012/0070068 A1* | 3/2012 | Pal et al. | 382/154 |
| 2012/0124530 A1* | 5/2012 | Lu | 716/55 |

OTHER PUBLICATIONS

Kouno et al., Consideration of Transition-Time Variability in Statistical Timing Analysis. Dept. of Communications and Computer Engineering, Kyoto University, Kyoto, 606-0501, Japan Jul. 2006 pp. 207-210.

Delp et al, The Development of the Complete X-Factor Contribution Measurement for Improving Cycle Time and Cycle Time Variability IEEE Transactions on Semiconductor Manufacturing, Aug. 2006 vol. 19, No. 3. pp. 352-362.

* cited by examiner

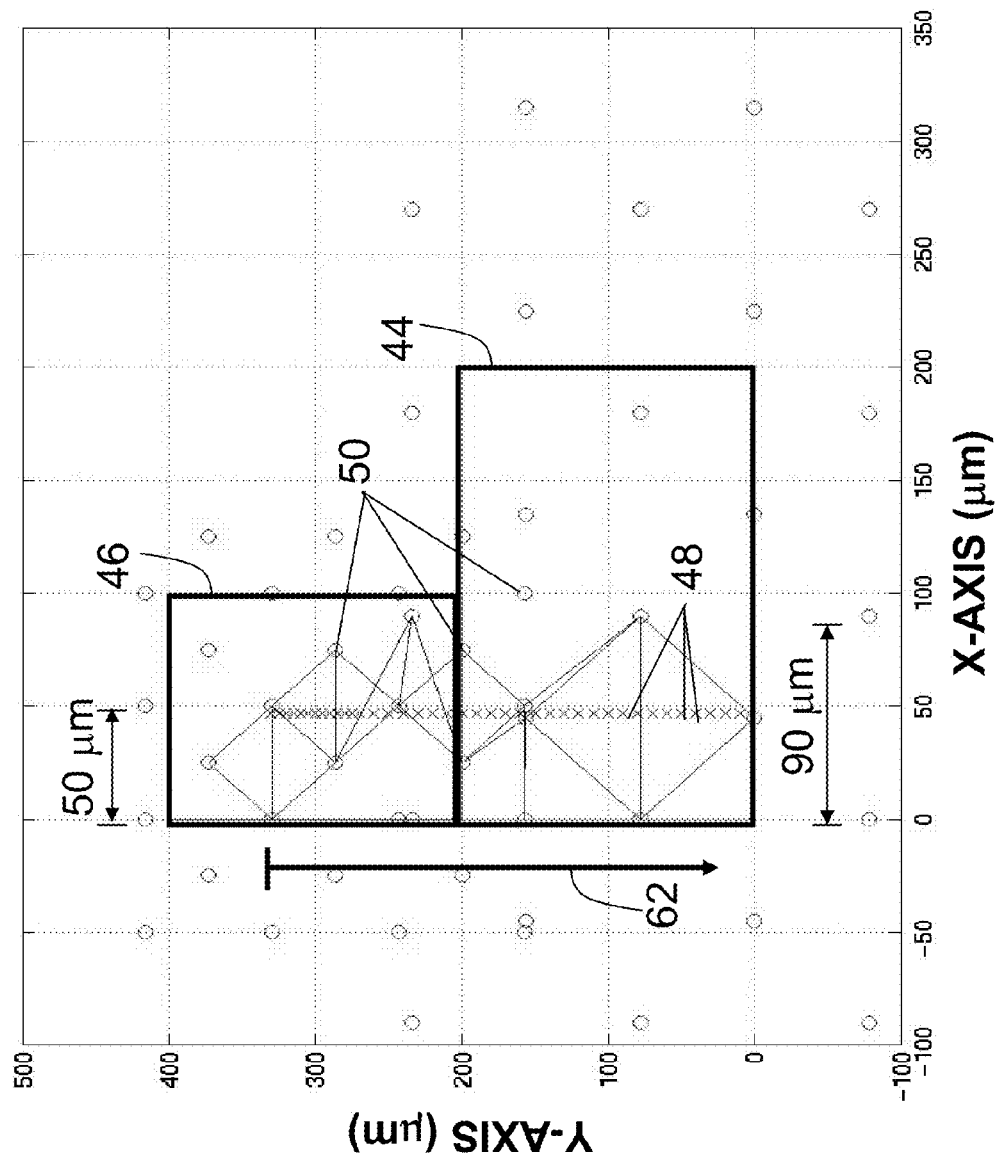

METHOD OF DISTRIBUTING A RANDOM VARIABLE USING STATISTICALLY CORRECT SPATIAL INTERPOLATION CONTINUOUSLY WITH SPATIALLY INHOMOGENEOUS STATISTICAL CORRELATION VERSUS DISTANCE, STANDARD DEVIATION, AND MEAN

BACKGROUND OF THE INVENTION

The invention relates generally to computerized modeling of integrated circuits and, in particular, to methods for distributing process variables by spatial interpolation for use in a circuit simulation tool.

Electronic design automation (EDA) tools, such as circuit simulation tools, are routinely used to model integrated circuits. Effective circuit simulation tools permit a circuit designer to simulate the behavior of a complex design, identify any problems, and make alterations and enhancements to the integrated circuit before arriving at a final design. Circuit simulation tools formulate and solve the nonlinear algebraic differential equations associated with an integrated circuit design, as is known in the art. Accurate simulation modeling of on-chip process variables, such as film thicknesses, is essential to accurately model high-performance circuit behavior, such as timing, power consumption, functionality, and design yield.

Various different conventional statistical spatial correlation methods for process variables are available for use in circuit simulation tools. In bounding box methods, a box is drawn around the objects that may be correlated and, based upon some metric of the box (e.g., a diagonal), a nominal level of spatial correlation is assumed. Unfortunately, bounding box methods represent an experience-based, heuristic approach. In exact methods, a principal component analysis (PCA) is executed to exactly identify the spatial correlation for each set of objects for which spatial correlation information is desired. Unfortunately, exact methods are a relatively expensive approach that is rarely implemented in practical tools.

Rectangular grid methods, which represent the prevalent approach for statistical spatial correlation, employ a fixed rectangular grid smaller than the spatial correlation distance. A single PCA is performed and applied to all sets of objects being considered, as a function of which grid cell they occupy. The rectangular grid approach assumes that the spatial correlation is constant within each grid, which allows the spatial correlation to be considered by defining the contents of each grid element to be a linear combination of the raw statistical data in the surrounding grids. Although conceptually similar to the rectangular grid approach, the hexagonal grid approach may be more computationally accurate given the higher packing density and lowered directional dependence of hexagonal grid cells in comparison with rectangular grid cells.

None of these conventional approaches is capable of continuously distributing the process variables across a chip, which denotes a significant deficiency. In rectangular and hexagonal grid approaches, discontinuities occur across grid boundaries. Devices bounded within each of the individual grid regions behave identically. However, devices bounded in adjacent grid regions behave differently regardless of the spacing between these devices, which leads to a mismatch in behavior. Generally, conventional approaches fail to maintain the local spatial correlation and, more often than not, are computationally inefficient.

Statistically-corrected spatial interpolation is an approach that does allow the continuous distribution of on-chip process variables and it is also computationally efficient. However, conventional statistically-corrected spatial interpolation relies on a uniform array of seed points distributed at the vertices of equilateral triangles. The problem with this approach is that the statistical correlation-versus-distance behavior of the process variable being modeled cannot change as a function of position on the chip. Also, the mean and standard deviations of the distributed process variable cannot change as a function of position on the chip. So, the method can only be used to model process variables that have a homogeneous global statistical correlation versus distance, standard deviation, and mean. Further, the approach is a numerical one which adds difficulty in the implementation of the method in conventional circuit simulation tools.

Consequently, improved methods are needed for distributing process variables for use in circuit simulation tools that overcome these and other deficiencies of conventional approaches of distributing process variables.

SUMMARY OF THE INVENTION

In one embodiment, a method is provided for modeling a process variable with spatially inhomogenous statistical correlation versus distance, standard deviation, and mean using statistically-correct spatial interpolation. The method includes forming an array of "seed" points from which values in the coordinate frame will be interpolated; assigning a symbolic, statistical variable to each "seed" point that will be used to assign a numerical value to each "seed" point for a simulation; and defining a number of test points at selected spatial locations in the coordinate frame. A symbolic equation that allows the computation of the numerical value of the random variable is determined for each of the test points by spatial interpolation from one or more of the symbolic random variables assigned to the nearest "seed" points. The method further includes adjusting the symbolic equation of the random variable distributed at each of the test points with a respective correction factor comprised of a symbolic equation determined at each test point.

BRIEF DESCRIPTION OF THE DRAWINGS

FIG. 6A is a diagrammatic view depicting an intersection of two different regular arrays of seed points and a straight-line array of test points in accordance with an embodiment of the invention.

DETAILED DESCRIPTION OF THE INVENTION

In accordance with embodiments of the invention, a symbolically represented process variable representing the global distribution of the process variable is distributed in a coordinate frame at arbitrarily placed seed points separated from adjacent seed points by a maximum distance equal to the maximum spatial correlation distance which is equal to the radius of influence in that region of the coordinate frame. In accordance with an embodiment, the coordinate frame is the (X,Y) Cartesian coordinate frame describing locations on the surface of a semiconductor chip. A statistically-correct spatial interpolation is used to determine the equation for the value of the process variable at any position on the chip. The algorithm, which is computationally efficient, can be implemented practically in the languages of conventional circuit simulation tools. Among the benefits of the embodiments of the invention is that process variables are continuously distributed across a coordinate frame even in the case of differing radii of influence in the coordinate frame in a computationally efficient manner. Global statistical distribution and local spatial correlation are maintained by the distribution process and the statistically-correct spatial interpolation.

Figure 1:
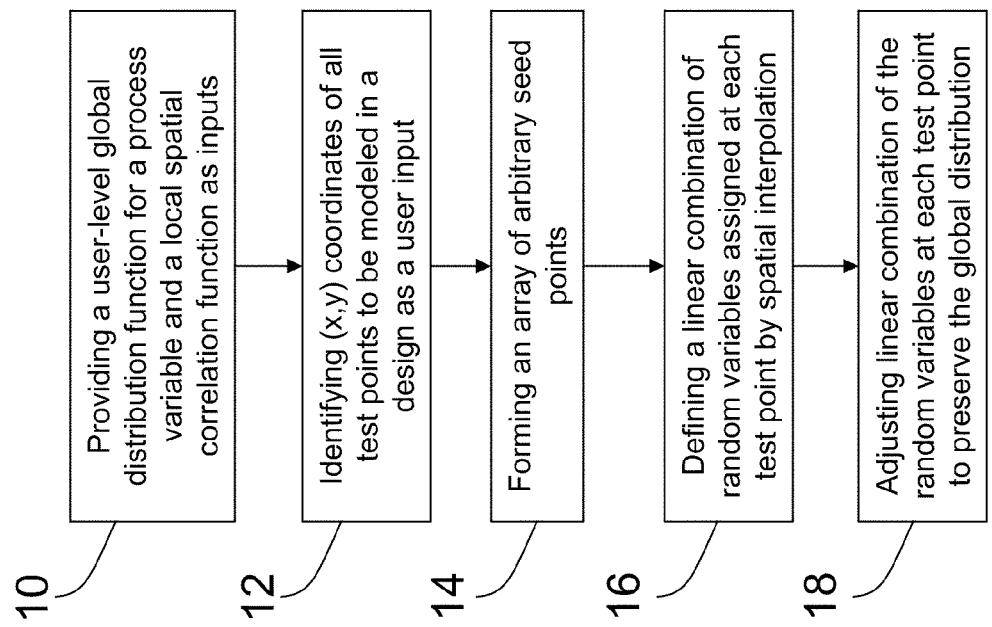
FIG. 1 is a flow chart of a method for continuously distributing a process variable using statistically-correct spatial interpolation in accordance with an embodiment of the invention.
Figure 2:
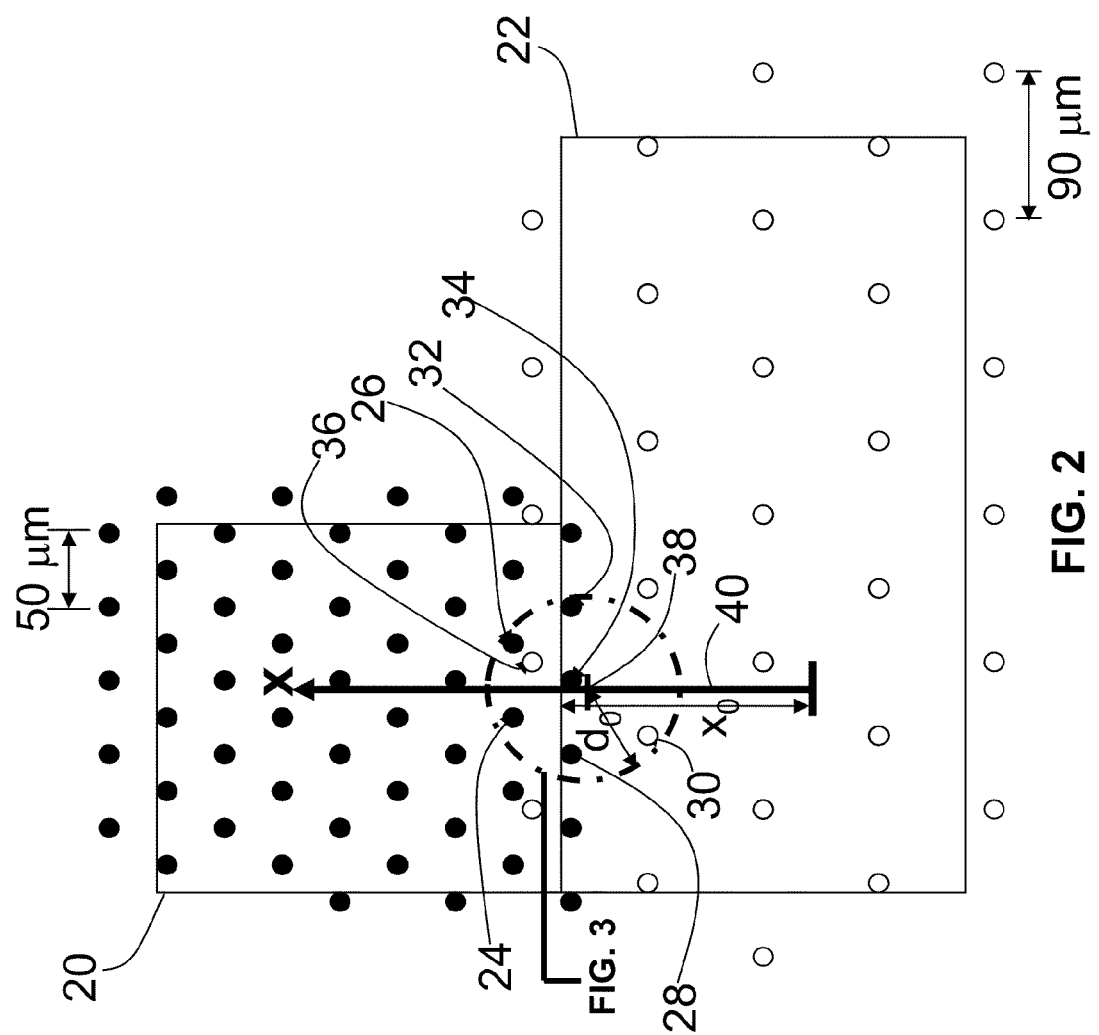
FIG. 2 is a diagrammatic view depicting an intersection of two different regular arrays of seed points in accordance with an embodiment of the invention.

With reference to FIG. 1 and in accordance with an embodiment of the invention, a user defines a global distribution function and local spatial correlation functions in block 10 as process inputs for use in distributing a process variable. Note that the local spatial correlation functions can be different at different locations in the coordinate frame. The user-defined global distribution function contains information relating to various measurements of the process variable made in chip regions 20 and 22 (FIG. 2). The global distribution function may be a Gaussian or normal distribution, although the invention is not so limited. For example, a Gaussian distribution with a mean of unity and a standard deviation (i.e., sigma) of 0.2 may be used as the global distribution function for the process variable. The global distribution function may be determined with the assistance of a data analysis software application such as MATLAB® commercially available from The MathWorks, Inc. (Natick, Mass.).

Correlation is the degree to which two or more quantities are linearly associated. The local spatial correlation inputs supply the maximum distance, $d_0$, between adjacent spatial locations of seed points from which the process variable is spatially interpolated. Spatial locations in the global distribution function that are near each other are more likely to have more similar characteristics than those placed far away, which is reflected in the local spatial correlation. For separations between the spatial locations of seed points and test points exceeding the maximum distance, $d_0$, the random process variable at the test point is no longer spatially correlated to the random process variable at the seed point. Instead, the test point and the seed point are assumed to be statistically independent.

In general, the value of the process variable at each spatial location is distributed within a range bounded between a minimum value and a maximum value. The process variable may be, for example, a height or thickness of the metallization for the M1-level wiring of a multi-level interconnect for the integrated circuit. As a numerical example, an ideal targeted thickness of, for example, 35 nanometers (nm) may be specified in the circuit design for the metallization thickness for the M1-level wiring as a across the entire chip. However, at different spatial locations within the chip regions 20 and 22, the actual metallization thickness may vary away from the targeted thickness. For example, the actual metallization thickness may range from a minimum value of 32 nm to a maximum value of 40 nm at different spatial locations within the chip regions 20 and 22.

For purposes of description, the term "chip" is considered herein to be synonymous with, and is used interchangeably with, the terms "integrated circuit" and "die".

In block 12, a line of possible test point locations is considered along the x-axis, 40, is identified in chip regions 20 and 22 where a process variable is to be distributed. The x-axis of the coordinate frame, 40, lies in both region 20 and region 22. Region 22 lies a distance, $x_0$, along the x-axis that originates in region 22. For example, a test point, 38, along the x-axis, 40, is input by the user in a planar (x-y) coordinate frame.

Figure 3:
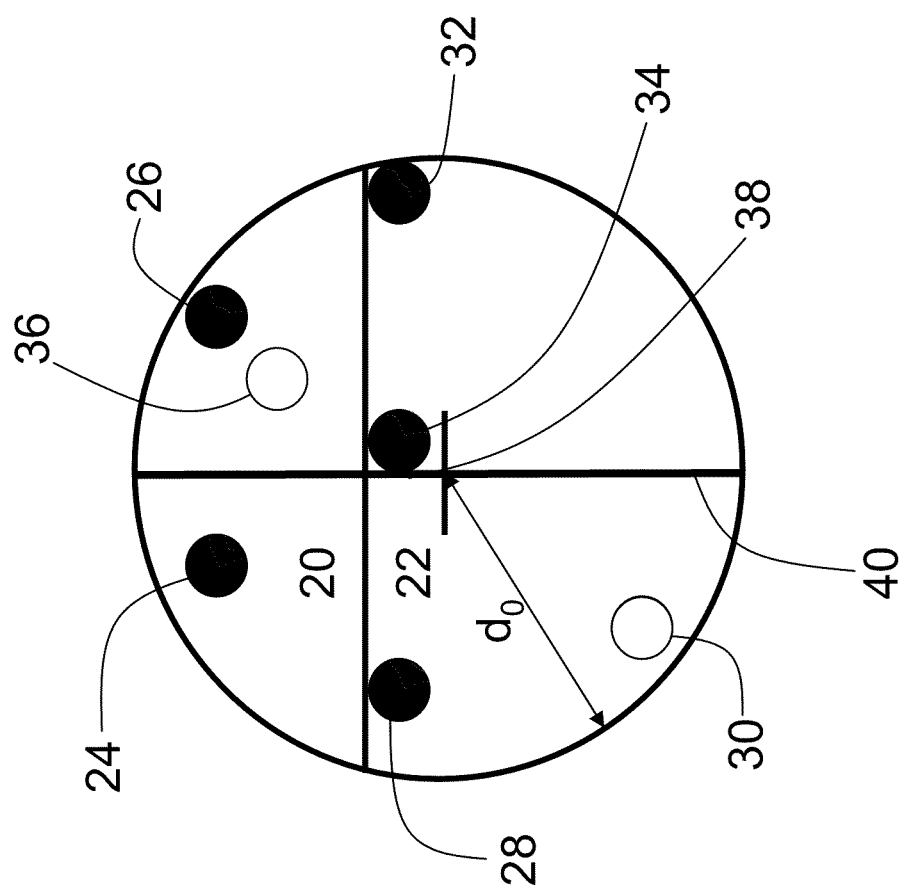
FIG. 3 is an enlarged view of a portion of FIG. 2.

In block 14, a plurality of seed points, such as the representative seed points 24, 26, 28, 30, 32, 34, and 36, for the process variable to be modeled in the chip design are identified in chip regions 20 and 22. As best shown in FIG. 3, adjacent pairs of seed points, including the representative seed points 24, 26, 28, 30, 32, 34, and 36 are spatially separated from the test point, 38, in the x-y plane by a maximum distance, $d_0$, where the local spatial correlation between seed points and test points equals zero. The seed points that are black (filled circles) in FIG. 2 and FIG. 3 correspond to seed points enclosing region 20 and have minimum spacings of $d_0$=50 μm. The seed points that are white (empty circles) in FIG. 2 and FIG. 3 correspond to seed points enclosing region 22 and have minimum spacings of $d_0$=90 μm. Note that some of the black and white seed points corresponding to regions 20 and 22 respectively lie outside of the edges/borders of the regions. This must be the case to model points along the edges of the regions. Note also that the distance between the two differently spaced seed points from regions 20 and 22 is labeled in FIG. 2 as 50 μm and 90 μm for seed points enclosing regions 20 and 22.

Figure 4:
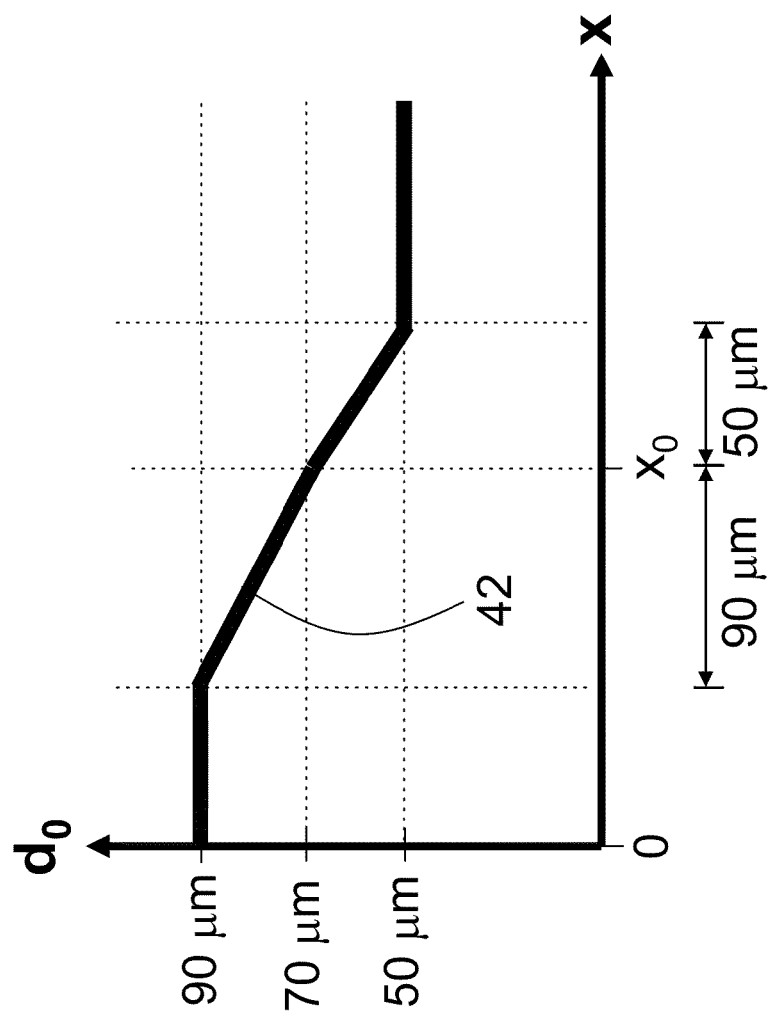
FIG. 4 is a plot of the radius of influence versus distance along the x-axis shown in FIG. 3.

In block 16, a symbolic equation is assigned to every test point on the chip in regions 20 and 22 that determines the random process variable as a linear combination of the global process distribution variables assigned to the seed points. For example, as shown in FIG. 3, an equation describing the process variable at the test point, 38, is determined as a linear combinations of the process variable assigned to the seed points within a circle of radius, d0, of the test point: seed points: 24, 26, 28, 30, 32, 34, and 36. In order to allow arrays of seed points with different spacing, or even arbitrary spacings to be used in statistically corrected spatial interpolation, this implementation utilizes a continuous "radius-of-influence", $d_0$, function across the coordinate frame. FIG. 4 shows a continuous function, 42, of the radius-of-influence, $d_0$, versus distance along the x-axis, 40, shown in FIG. 2. Notice that the radius-of-influence changes from 90 μm to 50 μm as the x-axis crosses from region 22 to region 20. In this case, the spacing of the seed points region 22 is equal to the radius-of-influence in region 22 ($d_0$=90 μm) and the spacing of the seed points in region 20 is equal to the radius-of-influence in region 20 ($d_0$=50 μm). The only way to ensure a continuous distribution of process variables at arbitrary test points across the chip is to maintain a continuous function for the radius-of-influence across the coordinate frame.

In block 16, a spatial interpolation method is used to determine the coefficients of the linear combination of the equation that represents the process variable at test point 38 (FIG. 3) identified in block 12. The spatial interpolation method may be implemented using a circuit simulator, such as HSPICE, commercially available from Synopsys, Inc. (San Jose, Calif.); or SPECTRE, commercially available from Cadence Design Systems, Inc. (San Jose, Calif.). A variety of different interpolation algorithms may be employed to interpolate the numerical value of the process variable at the spatial location of an individual test point, 38, as understood by a person having ordinary skill in the art.

In block 18, the equation representing the process variable at each test point derived through spatial interpolation is statistically corrected to account for deviations in the distribution at each test point location from the desired global distribution introduced by the spatial interpolation method. The statistical correction adjusts the spatial interpolation equations for the process variable at each test point such that the distribution of all the spatial interpolation equations at the test point locations conforms more closely with the original global distribution function specified as a process input in block 10.

In one embodiment, the statistical correction procedure involves mathematically adding a correction factor equation in the form of a linear equation of the random symbolic variables which are assigned to the seed point locations to every spatial interpolation equation for the process variable at the test point locations. The correction equations force the standard deviations and spatial correlation functions of the spatial interpolation equations to more closely match the standard deviations and spatial correlation functions of the user-defined global distribution function constituting one of the process inputs in block 10 (FIG. 1). In the absence of the correction factor equations, the standard deviations of the resulting random variable equations at each test point may be significantly smaller than the standard deviation of the desired global distribution function.

The offsets forming the correction-factor equations are continuous across the coordinate frame. The global distribution function is preserved on each iteration or run in a Monte Carlo runset, as well as for the accumulated results from different Monte Carlo runsets. The spatial correlation function is user-controlled and may vary across the coordinate frame.

Example 1

For purposes of Monte Carlo simulation, unlike other implementations of statistically-corrected spatial interpolation, it is not necessary to separate chip areas into different regions. Consider the straight line of test points 48 in FIG. 5A. The straight line of test points, 48, crosses between two regions with different separation distances between the seed points, 50, in the two regions, Region 44 and Region 46. The separation distance between the seed points in Region 44 is equal to the radius-of-influence in most of Region 44, $d_0$=90 μm. The separation distance between the seed points in Region 46 is equal to the radius-of-influence in most of Region 46, $d_0$=50 μm.

Figure 5A:
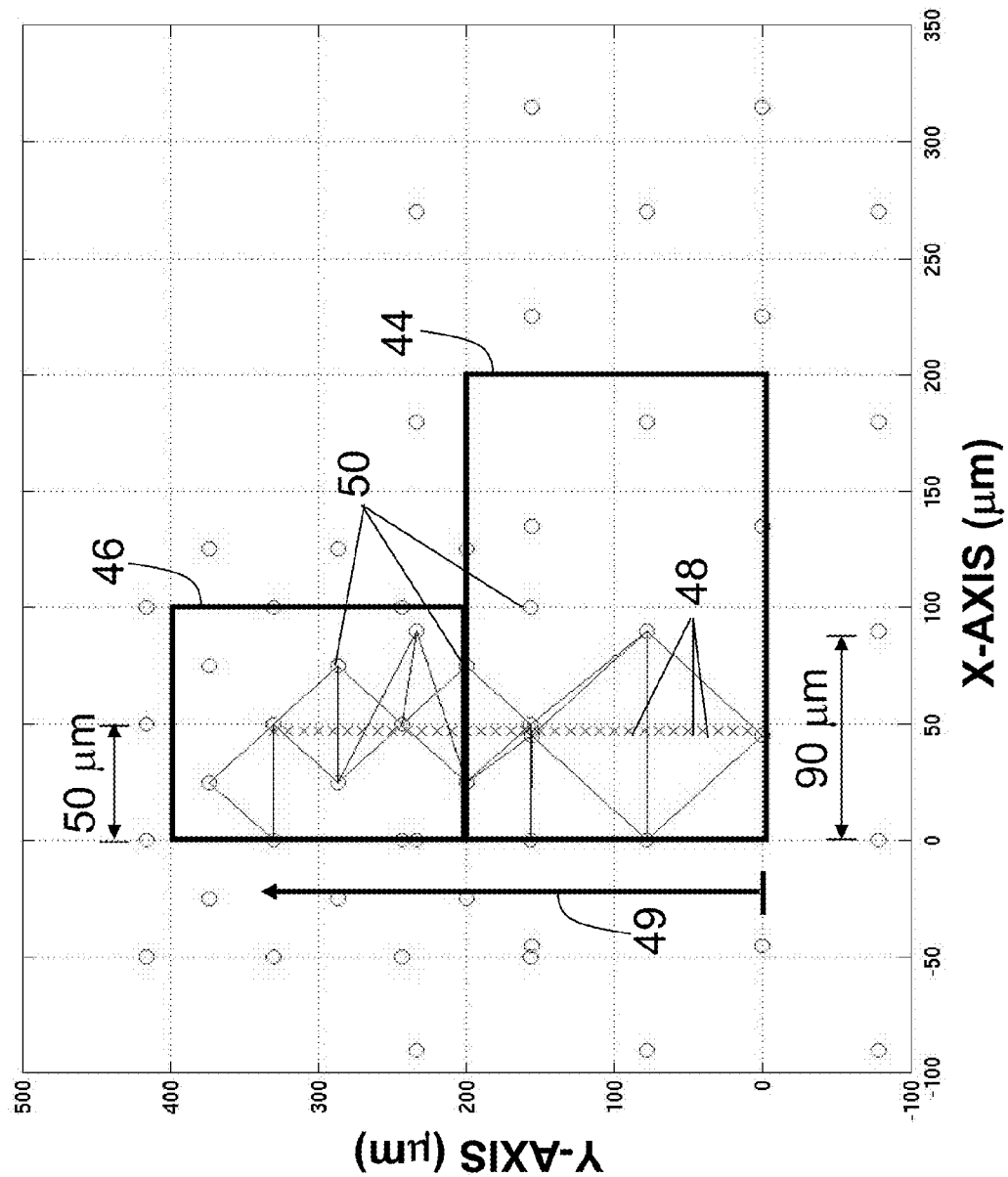
FIG. 5A is a diagrammatic view depicting an intersection of two different regular arrays of seed points and a straight-line array of test points in accordance with an embodiment of the invention.

As was shown in FIG. 3, test points in this statistically-corrected spatial interpolation implementation are only mathematically affected, or influenced, by seed points within the radius-of-influence, $d_0$, from a given test point, 38. In FIG. 5A, seed points, 50, that are within the radius-of-influence, $d_0$, of the straight-line test points are connected with lines. It can be seen that the seed points connected with lines are the seed points closest to the test points, as expected. The lines connecting the seed points are shown for illustration only to show which seed point locations, 50, where used in the computation of the test point location values, but they are not used in any way in this implementation of statistically corrected spatial interpolation.

For any of the representative test points, 48, in Regions 44 and 46, the symbolic equation for the process variable at a given test point location, (x,y) is given by Z(x,y), as follows:

$$Z(x,y)=\Sigma[a(i,x,y)*z(i)]+\alpha*\beta*\Sigma[a(i,x,y)*s(i)]+\text{mean}\\(\text{mean}(z(i)))*(1-\Sigma[a(i,x,y))]$$

$$a(i,x,y)=\text{corr}(d(i,x,y),d_0(x,y))$$

$$\text{corr}(d,d_0)=1-d/d_0 \ldots \text{ for } d<d_0$$

$$\text{corr}(d,d_0)=0 \ldots \text{ for } d>d_0$$

$$d(i,x,y)=((x_i-x)^2+(y_i-y)^2)^{1/2}$$

$$\alpha=(1-\Sigma[a(i,x,y)])^{1/2}$$

$$\beta=1/(\Sigma[a(i,x,y)])^{1/2}$$

$$s(i)=z_A(i)-\text{mean}(z_A(i))$$

The equation for Z(x,y) contains summations of terms with index, i, that refers to the index of the integer number of seed points within the radius-of-influence, $d_0$(x,y), of the test point located at the (x,y) location. For example, if there are seven seed points within $d_0$ from the test point location, as shown in FIG. 3, then: $1 \leq i \leq 7$. The terms z(i) are symbolically represented random variables assigned to a seed point, i, at location $(x_i,y_i)$. The terms s(i) at every seed point location, $(x_i,y_i)$, contain the terms $z_A(i)$ which is another symbolically represented random variable that has the same statistical a properties as z(i), for example, the same mean and standard deviation, but is statistically independent of z(i). Also, all z(i) and $z_A(i)$ terms at the seed point locations are statistically independent of each other.

The term a(i,x,y) present in the equation of Z(x,y) represents the results of the spatial interpolation function, corr(d, $d_0$), used in this statistically-corrected spatial interpolation method. The spatial correlation function used in this example is a simple linear spatial interpolation function that goes to zero for distance more that the radius-of-influence, $d_0$, from the test point location, (x,y). So, for each seed point within $d_0$ of the test point location, (x,y), a spatial interpolation term is obtained based on the separation distance, d(i,x,y), between that seed point location, $(x_i,y_i)$, and the test point location, (x,y).

The second summation term in the equation for Z(x,y) is the statistical correction term. It involves the factors α, β, s(i), and a(i,x,y). Equations for α and β are given above. This second term ensures that the standard deviation of the random variable equations at the test point locations is equal to the standard deviation of z(i) and $z_A$(i), which would typically be set to the desired global standard deviation as in this example. However, the standard deviation may change across the coordinate frame. For example, the standard deviations of the seed point process variables z(i) and $z_A$(i) may change at different locations ($x_i,y_i$). This standard deviation of the random variable may change based on changes in the local environment that affect standard deviation such as local metal layer density, pattern uniformity, etc.

The last summation term in the equation for Z(x,y) ensures that the mean of all of the test-point equations equals the average mean of the seed random variable means, mean(z(i)), at the seed-point locations within $d_0$ of the test point location, (x,y). However, the mean of the random variable, like the standard deviation, can change across the coordinate frame. For example, the mean of the seed-point process variables z(i) and $z_A$(i) may change at different locations ($x_i,y_i$). This mean of the random variable may change based on changes in the local environment that affect mean such as local metal layer density, pattern uniformity, etc.

The form of the equation for the random variable at any test-point location, given as Z(x,y), is the same at any location on the chip. This is quite different from statistically-corrected spatial interpolation methods that break up the coordinate frame into regions of equilateral triangle areas. This method does not require the coordinate frame to be separated into many regions. Also, the equations given above allow multiple seed-point grid spacings and even arbitrary seed-point placement. This was not possible with the previous statistically-corrected spatial interpolation method that depends on a constant-spaced equilateral seed-point grid across the coordinate frame (chip region) to be modeled. So, with this method, and the equations described above, the radius-of-influence may change across a chip area based on influences of the local environment at (x,y) that affect spatial correlation versus distance such as local metal layer density, pattern uniformity, etc.

Using the equations given and explained above, random variables were assigned to the straight-line test points locations, 48, shown in FIG. 5A.

Figure 5B:
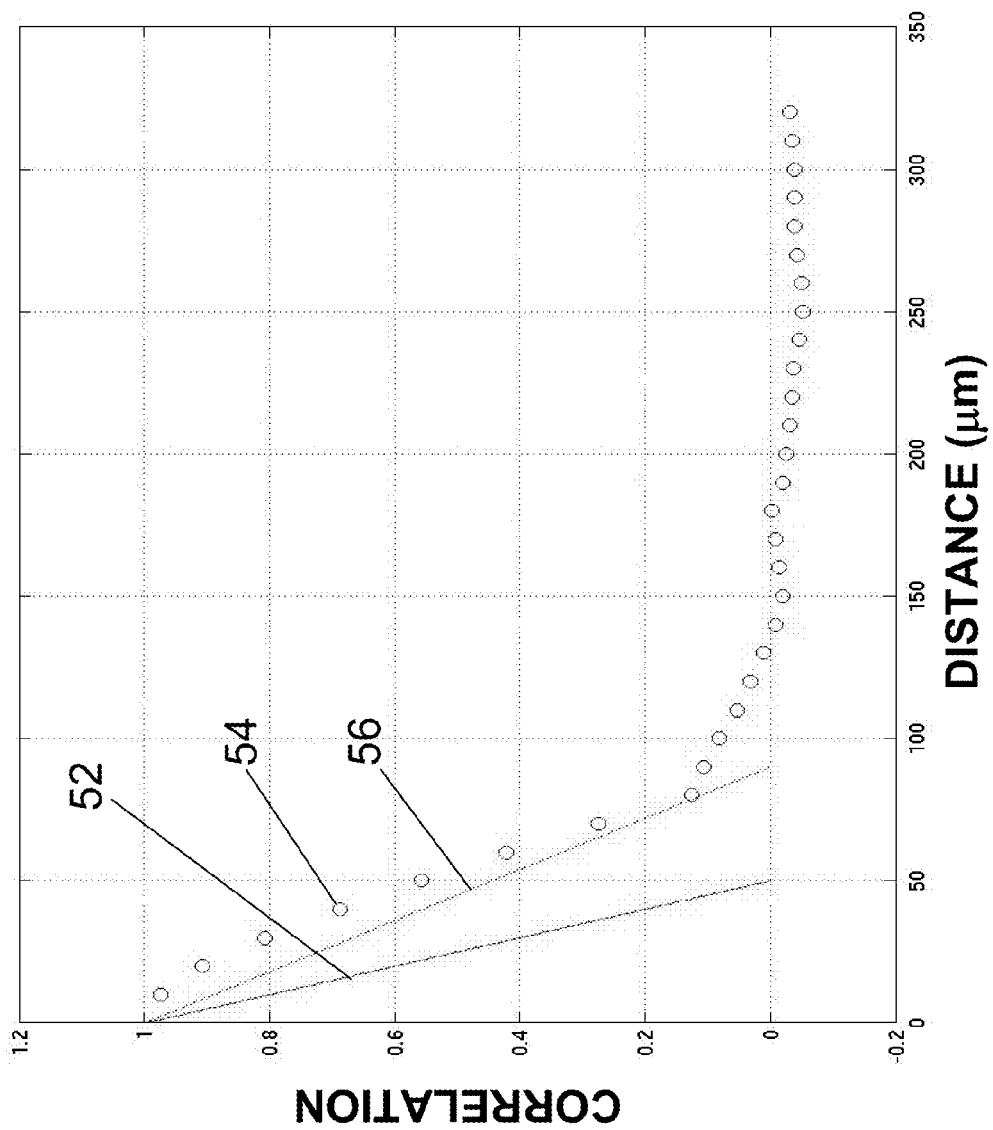
FIG. 5B is a diagrammatic graphical view depicting the spatial correlation for the statistically-correct interpolated values of the process variable at test points in the straight-line array in FIG. 5A compared to the initial test point in the straight-line array.

FIG. 5B show the statistical correlation, 54, between the initial test point located at the origin of the x-axis, 49, in FIG. 5A and all the other test points along the straight-line test point array. The statistical correlation data shown was the result of a 2000 run Monte Carlo runset. The distance axis in FIG. 5B corresponds to locations along the x-axis shown in FIG. 5A, 49. Notice that the statistical correlation goes to zero near 90 μm, which is equal to $d_0$ in Region 44. The desired minimum statistical correlation curve versus distance for Region 44 (FIG. 5A), is shown as 56 in FIG. 5B and can be seen to follow the simulated statistical correlation results. This means the simulation results followed the desired (input) minimum statistical correlation-vs.-distance function. This is what the simulation should show because the x-axis, 49, in FIG. 5A goes from Region 44 to Region 46.

Figure 5C:
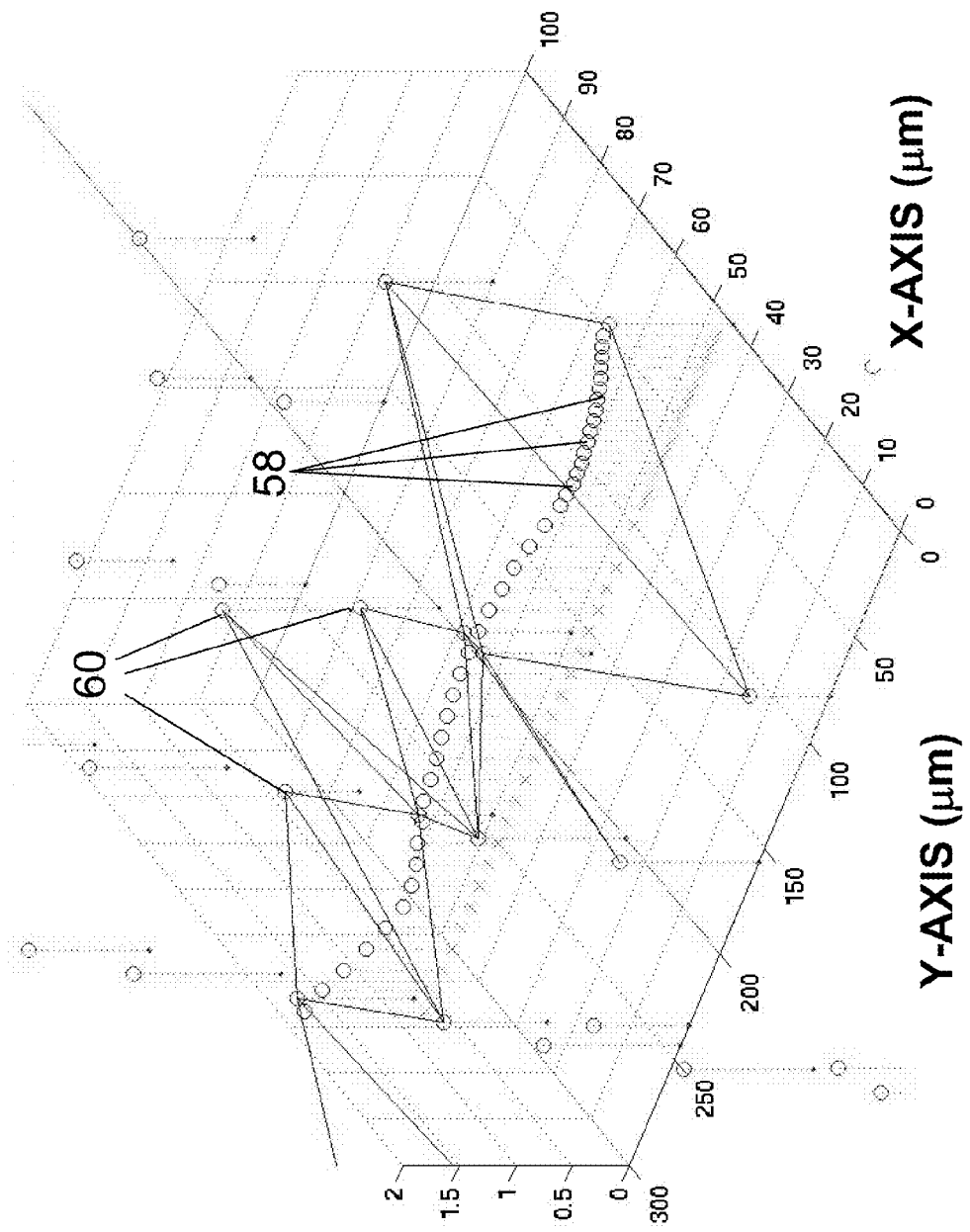
FIG. 5C is a graphical view depicting the values of the statistically-correct spatially interpolated values of the process variable at test points in the straight-line array and at the seed points in FIG. 5A.

FIG. 5C shows the process variable values at the seed points, 60, and test points, 58, in Regions 44 and 46 for a single run in the 2000-run Monte Carlo runset. Notice that the multiple test-point process variable values are indeed following a continuous curve between the two different grid sizes in Regions 44 and 46.

Example 2

Using the equations given and explained above, random variables were assigned to the straight-line test points locations, 48, shown in FIG. 6A.

Figure 6B:
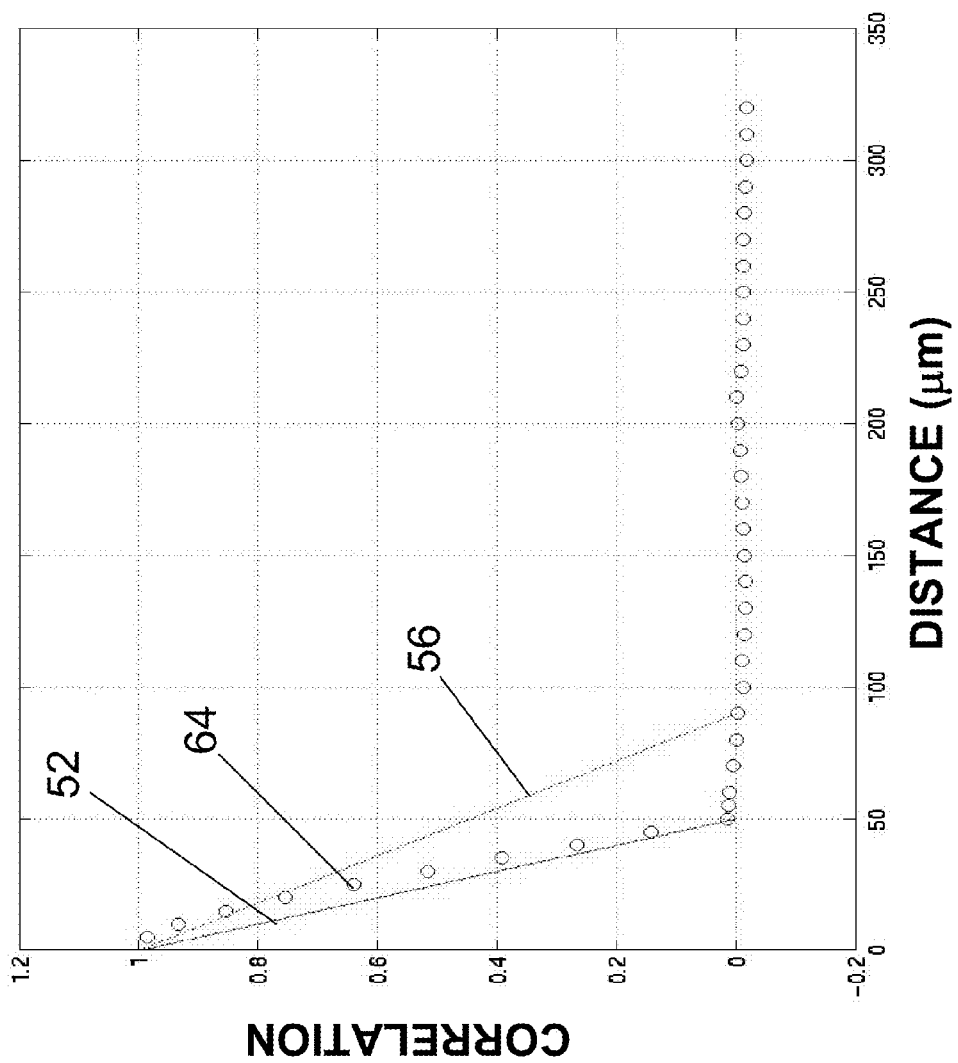
FIG. 6B is a diagrammatic graphical view depicting the spatial correlation for the statistically-correct spatially interpolated values of the process variable at test points in the straight-line array in FIG. 6A compared to the initial test point in the straight-line array.

FIG. 6B show the statistical correlation, 64, between the initial test point located at the origin of the x-axis, 62, in FIG. 6A and all the other test points along the straight-line test point array. The statistical correlation data shown was the result of a 10000-run Monte Carlo runset. The distance axis in FIG. 6B corresponds to locations along the x-axis shown in FIG. 6A, 62. Notice that the statistical correlation goes to zero near 50 μm, which is equal to $d_0$ in Region 46. The desired minimum statistical correlation curve versus distance for Region 46, is shown as 52 in FIG. 6B and can be seen to follow the simulated statistical correlation results. This means the simulation results followed the desired (input) minimum statistical correlation-vs.-distance function. This is what the simulation should show because the x-axis, 62, in FIG. 6A goes from Region 46 to Region 44.

Figure 6C:
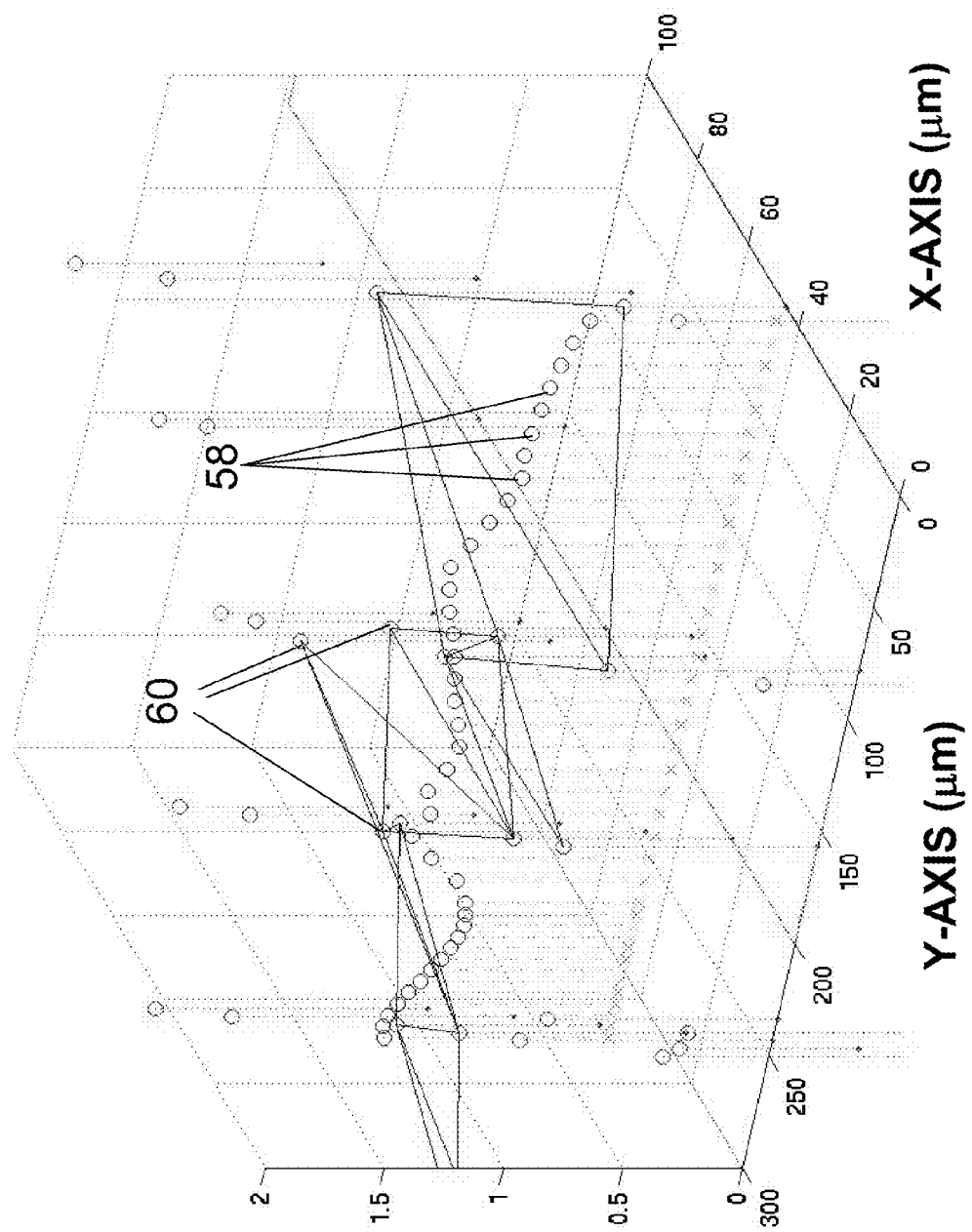
FIG. 6C is a graphical view depicting the values of the statistically-correct interpolated values of the process variable at test points in the straight-line array and at the seed points in FIG. 6A.

FIG. 6C shows the process variable values at the seed points, 60, and test points, 58, in Regions 44 and 46 for a single run in the 10000-run Monte Carlo runset, Notice that the multiple test point process variable values are indeed following a continuous curve between the two different grid sizes in Regions 44 and 46.

Examples 1 and 2 show that this method of statistically-corrected spatial interpolations allows multiple grid sizes to be joined in a continuous manner while allowing different statistical correlation-vs.-distance behavior in different regions of the coordinate frame.

Example 3

Figure 7A:
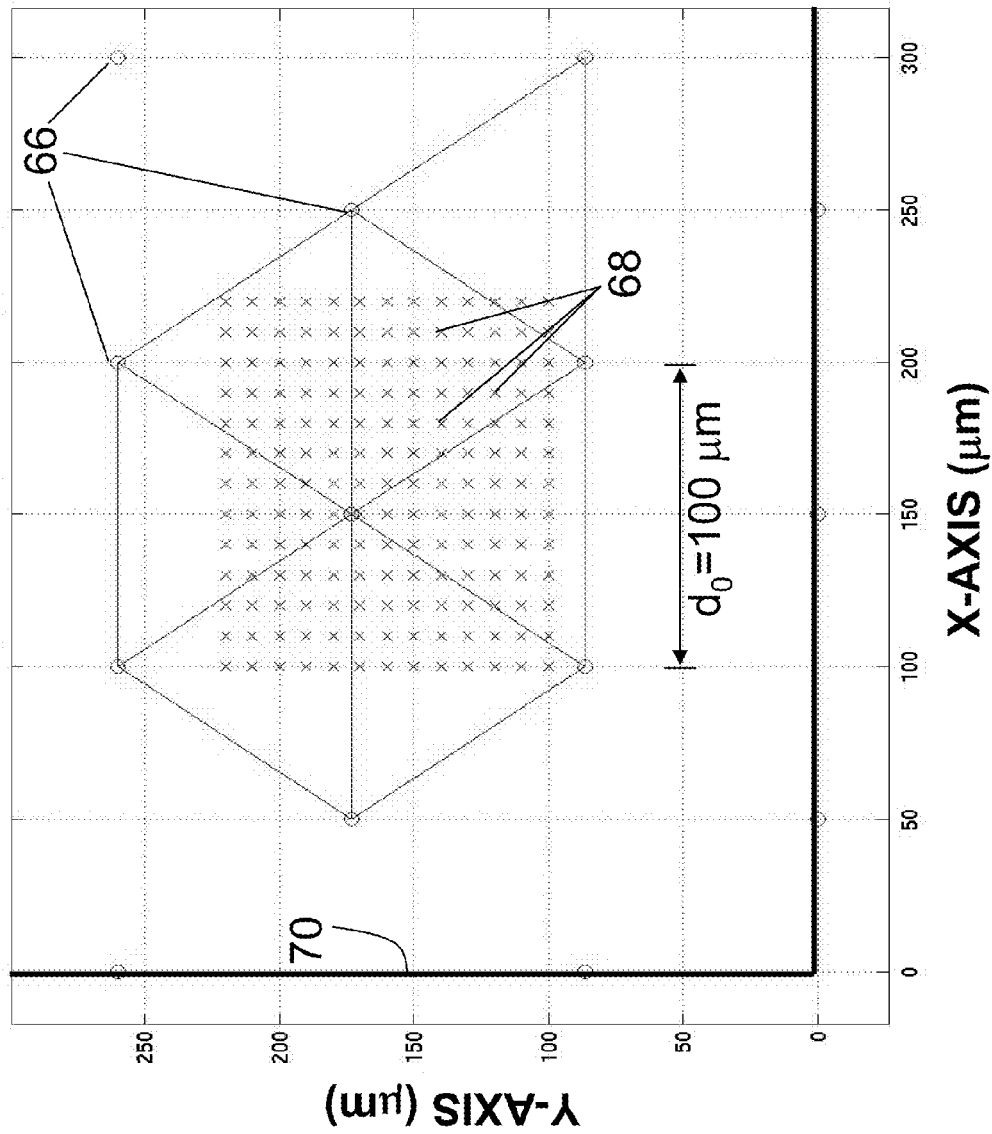
FIG. 7A is a diagrammatic view depicting a regular array of seed points and a regular array of test points in accordance with an embodiment of the invention.

In FIG. 7A, a regular equilateral triangle seed point, 66, grid spacing is employed as is used in a previous statistically-corrected spatial interpolation method. The test points in FIG. 7A, 68, are in a regular grid with constant offsets between the test points in the x and y directions. The seed point locations that are actually used in constructing the random variable equations for the test points, 68, are the ones connected with solid lines. Note that these solid lines are not used in this method of statistically-corrected spatial interpolation, and they are only present in FIG. 7A to illustrate which seed points, 66, are within $d_0$=100 μm from the test points, 68.

After 1000 Monte Carlo iterations, using the method and equations described above and the test points, 68, and seed points, 66, shown in FIG. 7A, the interpolated values of the process variable at the test points locations, 68, exhibited a mean of 1.01 and a standard deviation of 0.14. After executing a statistical correction as outlined above, the statistically-correct interpolated values of the process variable at the test points exhibited a mean of 1.01 and a standard deviation of 0.20. The desired global process variable statistical behavior used as an input in this method had a mean of 1.01 and a standard deviation of 0.20. The conclusion is that the statistical correction procedure causes the mean and standard deviation of the interpolated values of the process variable to more closely approximate the mean and standard deviation of the desired global distribution function used as an input.

Figure 7B:
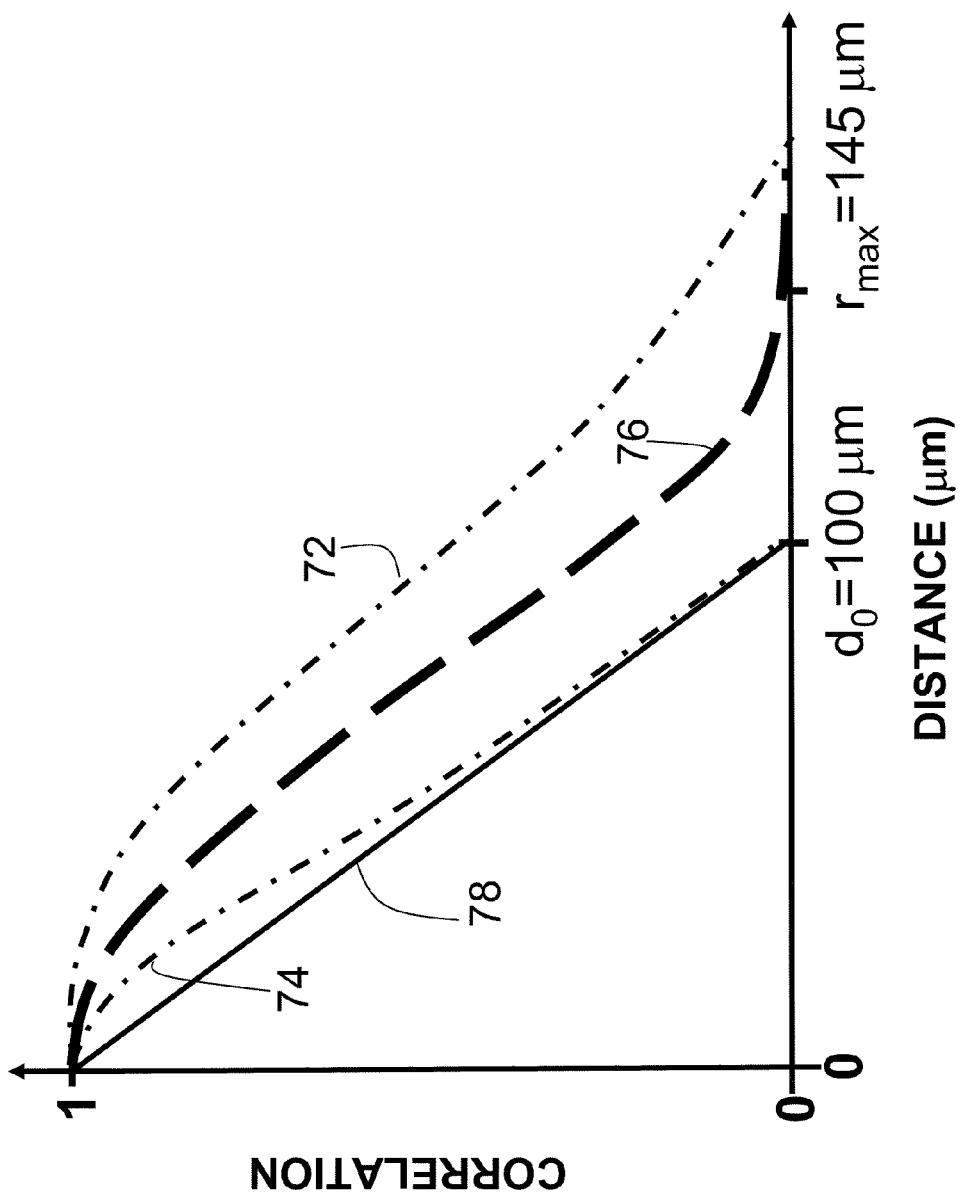
FIG. 7B is a diagrammatic graphical view depicting the spatial correlation for the statistically-correct spatially interpolated values of the process variable at test points in the regular array in FIG. 7A compared to every other test point in the regular array.

In FIG. 7B, the local spatial correlation for the statistically-correct interpolated values of the process variable is plotted as a function of separation distance between each test point, 68, and every other test point, 68, shown in FIG. 7A for the 1000 Monte Carlo iterations. An envelope is defined that bounds the scatter plot of the correlation coefficient from test point locations to different test point locations after 1000 Monte Carlo runs: from below, 74, and above, 72. Line 78 represents the desired global minimum statistical correlation-vs.-distance input into this interpolation process, which approaches zero at the maximum distance for the local spatial correlation, $d_0$=100 µm. Unlike the previous statistically-corrected spatial interpolation approaches, the statistical-correlation scatter plot versus distance is different for this method even in the exemplary case used in the previous method. Notice that the envelope is all above the minimum correlation line, 78. In the previous method, the scatter plot surrounded the minimum correlation line, 78. A good fit approximation, 76, to the scatter-plot behavior contained in the envelope defined by 72 and 74 is given as:

$$\rho(d)=\cos^2(\pi*d/2*r_{max})$$

In FIG. 7B, the maximum correlation distance, $d_0$, exactly matches where the minimum correlation line, 78, meets zero and where the lower envelope of the statistical correlation scatter plot of all the test points simulated from FIG. 7B, 74, intersects zero correlation. The statistical correlation function, $\rho(d)$, contains the term $r_{max}$ which is also shown in FIG. 7B. Here, $r_{max}$, is the maximum correlation distance for the averaged statistical correlation produced by this method. This number is useful in predicting how far apart two test points in the coordinate frame must be before the average expected statistical correlation goes to zero. For the equilateral seed point grid spacing shown in FIG. 7A, $r_{max}$~$d_0$/0.7~145 µm. In this method, $d_0 < r_{max}$.

Figure 7C:
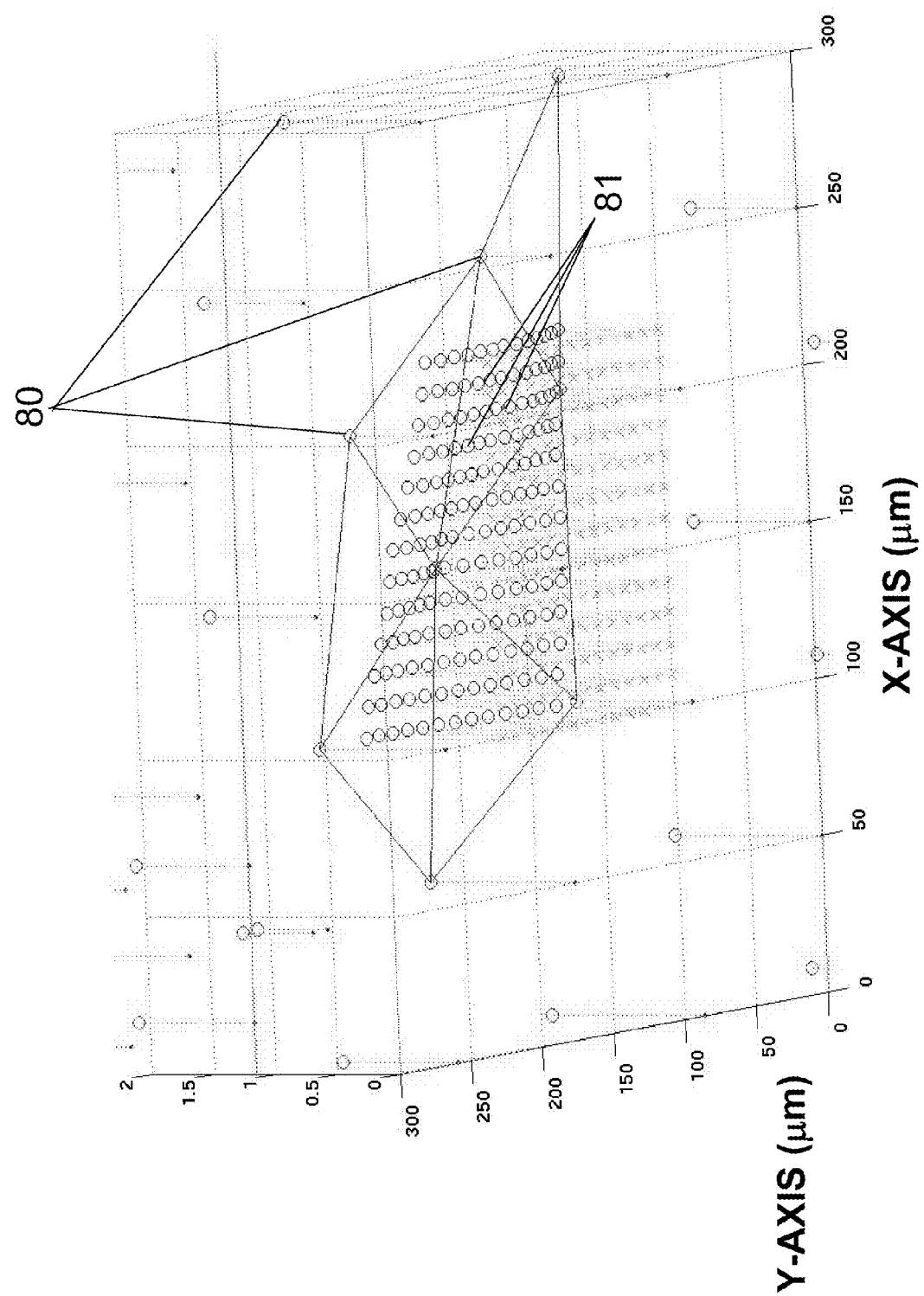
FIG. 7C is a graphical view depicting the values of the statistically-correct interpolated values of the process variable at test points in the regular array and at the seed points in FIG. 7A.

FIG. 7C shows the random variable values at the test point locations, 81, and seed-point locations, 80 for a single run in the 1000-run Monte Carlo runset. Notice that the symbolic equations at all of the test points produce a result that follows a continuous curve of the process variable.

So, this method of statistically-corrected spatial interpolations has been shown in Examples 1 and 2 to be able to maintain continuous process variable distribution across multiple grid sizes and using multiple statistical correlation-vs.-distance input functions. Example 3 shows the difference in performance in the statistical correlation-vs-distance scatter plot of this method and a previously described statistically-corrected spatial interpolation method that only works for homogeneous equilateral seed-point grid spacings where the coordinate frame can be divided into component regions within equilateral triangle areas. Example 3 showed that the statistical correction caused the simulated standard deviation of all the test points to match the global targets while maintaining a continuous distribution of the process variable.

In alternative embodiments of the invention, the local spatial correlation does not have to extend from unity to zero, as shown in FIG. 5. For example, the local spatial correlation may begin at a numerical value less than unity to represent truly random variations. As another example, the local spatial correlation can end above zero to represent global process variations.

The statistically correct interpolation techniques are described herein in the context of the design of on-chip circuitry and variations of process parameters or variables inside a single die (i.e., intra-die variations). However, the statistically-correct interpolation techniques may find wider applicability in any technological field that requires correct spatial correlation of a random parameter or variable.

The various method embodiments of the invention will be generally implemented by a computer executing a sequence of program instructions for carrying out the steps of the method, assuming all required data for processing is accessible to the computer. The sequence of program instructions may be embodied in a computer program product comprising media storing the program instructions. As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the method, and variations on the method as described herein. Alternatively, a specific use computer, containing specialized hardware for carrying out one or more of the functional tasks of the invention, could be utilized.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM) or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then complied, interpreted, of otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave, The computer usable program code may be transmitted using any appropriate medium, including but not limited to wireless, wired, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider).

The present invention is described above with reference to flow chart illustrations and/or block diagrams of methods, apparatus (systems) and computer program products according to embodiments of the invention. It will be understood that each block of the flow chart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions means which implement the function/act specified in the flowchart and/or block diagram block of blocks.

The computer program instruction may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although a few examples of the present invention have been shown and described, it would be appreciated by those skilled in the art that changes might be made in these embodiments without departing from the principles and spirit of the invention, the scope of which is defined in the claims and their equivalents.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A computer-implemented method of distributing random variables using statistically correct spatial interpolation, the method comprising:

forming, by a computer, an array of seed points with a maximum separation distance between the seed points less than a radius-of-influence, $d_0$, in a region of a coordinate frame;

assigning, by said computer, independent random variables at each of the seed points;

defining, by said computer, a plurality of test points in the coordinate frame;

defining, by said computer, a linear combination of the random variables at each of the test points by spatial interpolation from one or more of the independent random variables assigned at each seed point within the radius-of-influence, $d_0$, of the test points; and adjusting, by said computer, the linear combination of the random variables at each of the test points with a respective function to preserve global statistical distribution characteristics of a mean and a standard deviation.

2. The method of claim 1 wherein the array of seed points comprises multiple arbitrary arrays of seed points.

3. The method of claim 1 wherein the array of seed points comprises a set of arbitrarily placed seed points.

4. The method of claim 1 wherein the radius-of-influence $(d_0(x,y))$ is a continuous function across the coordinate frame.

5. The method of claim 4 wherein $(d0(x,y))$ is said continuous function based on influences of a local environment at $(x,y)$ that affect statistical correlation vs. distance.

6. The method of claim 1 wherein the random variable standard deviation $(s(x,y))$ is continuous function across the coordinate frame.

7. The method of claim 6 wherein $(s(x,y))$ is said continuous function based on influence of a local environment at $(x,y)$ that affect said standard deviation.

8. The method of claim 1 wherein the random variable mean $(\mu(x,y))$ is a continuous function across the coordinate frame.

9. The method of claim 8 wherein $\mu(x,y)$ is said continuous function based on influences of a local environment at $(x,y)$ that affect the mean.

10. The method of claim 1 wherein assigning the independent random variables at each of the seed points further comprises:

constructing independent random variables for each seed point based on the global statistical distribution characteristics of a global random variable being modeled including the mean and the standard deviation.

11. The method of claim 10 wherein the global random variable is associated with a global standard deviation, and each respective correction equation's standard deviation term is selected to reduce a difference between a local standard deviation of the equations of the random variable at the test points and the global standard deviation of the global random variable.

12. The method of claim 10 wherein the global random variable is associated with a global mean, and each respective correction equation's mean term is selected to reduce a difference between a local mean of the equations of the random variable at the test points and the global mean of the global random variable.

13. The method of claim 10 wherein the global random variable is associated with a position-dependent local standard deviation which is based on influences of a local environment that affect the standard deviation, and each respective correction equation's standard deviation term is selected to reduce a difference between a local standard deviation of the equations of the random variable at the test points and the local standard deviation of the global random variable.

14. The method of claim 6 wherein the global random variable is associated with a position-dependent local mean which is based on influences of a local environment that affect the mean, and each respective correction equation's mean term is selected to reduce a difference between a local mean of the equations of the random variable at the test points and the local mean of the global random variable.

15. The method of claim 1 wherein the independent random variables at each seed point of the array is assigned based on the global statistical distribution characteristics of the mean and the standard deviation, and further comprising:
assigning the independent random variables to each seed point that have the same standard deviation as the global statistical distribution characteristics with the mean set equal to zero;
determining a linear interpolation equation based upon a spatial location of each of the test points relative to respective spatial locations in the coordinate frame of the seed points; and
determining an equation of a respective correction factor used to adjust the standard deviation of the linear interpolation equation of the random variables at each of the test points; and
determining an equation of a respective correction factor used to adjust the mean of the linear interpolation equation of the random variables at each of the test points.

16. The method of claim 1 further comprising:
determining an equation for the random variables for each of the test points with a mathematical algorithm.

17. The method of claim 1 wherein adjusting a linear spatial interpolation equation of the random variables at each of the test points with respective correction equations further comprises:
adding respective correction equation terms for mean and standard deviation to the linear spatial interpolation equation at each of the test points.

18. A computer program product comprising a non-transitory computer useable medium including a computer readable program, wherein the computer readable program when executed on a computer causes the computer to implement a method for distributing random variables using statistically correct spatial interpolation, the method comprising:
forming an array of seed points with a maximum separation distance between the seed points less than a radius-of-influence, $d_0$, in a region of a coordinate frame;
assigning independent random variables at each of the seed points;
defining a plurality of test points in the coordinate frame;
defining a linear combination of the random variables at each of the test points by spatial interpolation from one or more of the independent random variables assigned at each seed point within the radius-of-influence, $d_0$, of the test points; and
adjusting the linear combination of the random variables at each of the test points with a respective function to preserve global statistical distribution characteristics of a mean and a standard deviation.

19. The computer program product according to claim 18 wherein the array of seed points comprises multiple arbitrary arrays of seed points.

20. The computer program product according to claim 18 wherein the array of seed points comprises a set of arbitrarily placed seed points.

21. The computer program product according to claim 18 wherein the radius-of-influence is $(d_0(x,y))$ is a continuous function across the coordinate frame.

22. The computer program product according to claim 18 wherein the random variable standard deviation is a continuous function across the coordinate frame.

23. The computer program product according to claim 18 wherein the random variable mean $(\mu(x,y))$ is a continuous function across the coordinate frame.

24. The computer program product according to claim 18 wherein assigning the independent random variables at each of the seed points further comprises:
constructing independent random variables for each seed point based on the global statistical distribution characteristics of a global random variable being modeled including the mean and the standard deviation.

25. The computer program product according to claim 18 wherein the independent random variables at each seed point of the array is assigned based on the global statistical distribution characteristics of the mean and the standard deviation, and further comprising:
assigning the independent random variables to each seed point that have the same standard deviation as the global statistical distribution characteristics with the mean set equal to zero;
determining a linear interpolation equation based upon a spatial location of each of the test points relative to respective spatial locations in the coordinate frame of the seed points; and
determining an equation of a respective correction factor used to adjust the standard deviation of the linear interpolation equation of the random variables at each of the test points; and
determining an equation of a respective correction factor used to adjust the mean of the linear interpolation equation of the random variables at each of the test points.

26. The computer program product according to claim 18 further comprising determining an equation for the random variables for each of the test points with a mathematical algorithm.

27. The computer program product according to claim 18 wherein adjusting a linear spatial interpolation equation of the random variables at each of the test points with respective correction equations further comprises:
adding respective correction equation terms for mean and standard deviation to the linear spatial interpolation equation at each of the test points.

* * * * *